United States Patent [19]
Daitoku et al.

[11] 3,747,497
[45] July 24, 1973

[54] CAMERA DRIVE SYSTEM INCLUDING MOTOR DRIVE UNIT AND LONG-FILM MAGAZINE

[75] Inventors: Koichi Daitoku; Shiro Sugimori, both of Tokyo, Japan

[73] Assignee: Nippon Kogaku K.K., Chiyoda-ku, Tokyo, Japan

[22] Filed: Sept. 15, 1972

[21] Appl. No.: 289,455

[30] Foreign Application Priority Data
Sept. 20, 1971 Japan ....... 46/85594 (utility model)

[52] U.S. Cl. ............... 95/31 EL, 95/19, 95/31 AC, 95/31 CA
[51] Int. Cl. ..................... G03b 19/04, G03b 17/36
[58] Field of Search .................... 95/31 EL, 31 AC, 95/19, 31 CA; 242/71.5, 71.6

[56] References Cited
FOREIGN PATENTS OR APPLICATIONS
1,149,605   5/1963   Germany ......................... 95/31 AC Primary Examiner—Robert P. Greiner
Attorney—Shapiro and Shapiro

[57] ABSTRACT

A camera drive system in which a motor drive unit is adapted for use with a long-film magazine, the magazine having a frame counter switch which assumes control of the motor of the drive unit when the magazine and the drive unit are coupled together. A frame counter switch of the drive unit, which normally controls the motor of the drive unit, is rendered ineffective upon the coupling of the magazine to the drive unit. The long-film magazine has a motor which is controlled by a further switch of the drive unit, so as to advance the film cooperatively with the drive unit motor.

8 Claims, 4 Drawing Figures

PATENTED JUL 24 1973  3,747,497

3,747,497

CAMERA DRIVE SYSTEM INCLUDING MOTOR DRIVE UNIT AND LONG-FILM MAGAZINE

BACKGROUND OF THE INVENTION

1. Field of the Invention

This invention relates to a drive system for a camera and is more particularly directed to a drive system including a motor drive unit adapted to be used in combination with a long-film magazine.

2. Description of the Prior Art

The conventional motor drive unit for a camera has an inverse-count type frame counter having a switch associated therewith which stops the operation of the drive motor when the frame counter dial reaches its zero position, indicating that all of the frames of film in the camera have been exposed. When a conventional motor drive unit is used in combination with a long-film magazine, the film is transported by rotating a sprocket of the camera with the motor in the motor drive unit, and thus transported film is wound up by rotating a take up spool of the long-film magazine with a drive motor therein. Thus, the film advance operation is effected. The shutter charge and shutter release operations are effected by the motor of the motor drive unit. The number of frames of film which may be loaded into a long-film magazine is several times the number of frames which may otherwise be loaded in the camera.

In order to accomplish simultaneous operation of the motor drive unit and long-film magazine unit, the magazine unit is provided with a further switch associated with a further inverse-count type frame counter, and the two switches are connected in parallel. As a result, the motor circuits of the two units remain closed to maintain proper operation of the units even when the frame counter switch of the motor drive unit is open. The operation of both units is terminated when the frame counter dial of the long-film magazine unit reaches its zero position.

The prior art devices having switches connected in parallel as above described have certain disadvantages or limitations. When the long-film magazine is loaded with a relatively short length of film, for example approximately thirty frames long, the frame counter dial of the motor drive unit must be set to a position corresponding to that of the frame counter dial of the long-film magazine unit. Otherwise, the frame counter switch of the motor drive unit may remain closed and maintain the motor circuits closed even though the frame counter switch of the long-film magazine unit is opened when the film therein is exhausted. Continued film advance operation under such conditions may result in breaking the film. Another disadvantage of the prior devices is that the frame counter dials of both units must be set to the same position when it is desired to stop the operation of the two units after some of the film has been exposed.

SUMMARY OF THE INVENTION

The primary object of the present invention is to provide a system which eliminates the above-noted disadvantages by an arrangement which ensures that the motor circuits of both the motor drive unit and the long-film magazine are controlled by the frame counter switch of the long-film magazine, the frame counter switch of the motor drive unit being rendered ineffective when the long-film magazine is employed in conjunction with the motor drive unit.

In accordance with a preferred and exemplary embodiment of the invention, a motor drive unit for a camera includes an electric motor for advancing the film and charging and releasing the shutter, energization of the motor normally being controlled by a frame counter switch of the motor drive unit which is opened when the frame counter of the drive unit reaches zero. However, when the motor drive unit is coupled to a long-film magazine unit, the frame counter switch of the motor drive unit is rendered ineffective, and control of the energization of the drive unit motor is assumed by a frame counter switch of the long-film magazine unit, which opens the energization circuit when a frame counter of the long-film magazine unit reaches zero. The long-film magazine unit has a film-advance motor which is controlled by a further switch of the motor drive unit, but both motor circuits are opened when the frame counter switch of the long-film magazine is opened.

BRIEF DESCRIPTION OF THE DRAWINGS

The invention will be better understood from the following detailed description of preferred embodiments taken in conjunction with the accompanying drawings, in which.

DESCRIPTION OF THE PREFERRED EMBODIMENTS

Figure 1:
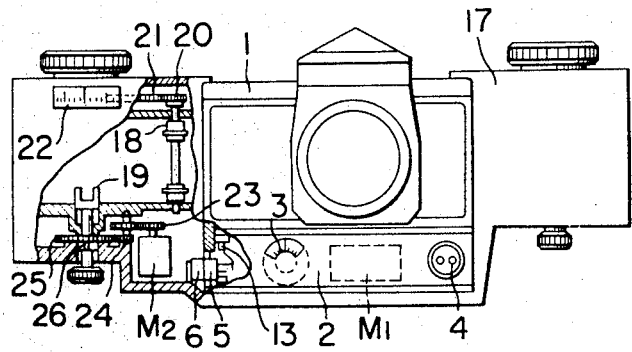
FIG. 1 is a front view of a camera with both the motor drive unit and a long-film magazine unit assembled therewith.

Referring to FIG. 1, a camera body 1 has a motor drive unit 2 attached thereto in a conventional manner. The motor drive unit includes an electric drive motor M1 and a frame counter 3 of the inverse-count type having a dial with a scale for indicating the maximum available number of film frames. As known in the art, the counter dial is set to the number of frames to be exposed and moves one scale division toward zero in response to the advance of each frame of film. A normally closed switch S4 (see FIG. 3) is associated with the frame counter and is opened when the counter dial reaches its zero position, that is, when all of the frames of film in the camera have been exposed. A connector 4 is provided for connection with an external power source. Connectors 5 and 6, having mating terminals such as 7 and 8 (see FIG. 2), are provided for coupling the motor drive unit 2 to a long-film magazine unit 17. Snap ring 9 may be employed to hold terminal 8 in place.

Figure 2:
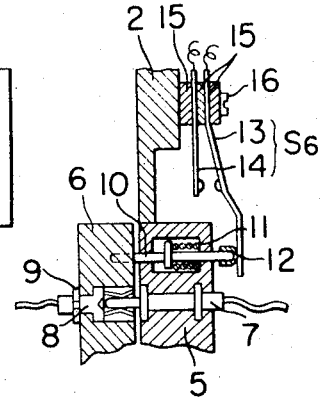
FIG. 2 is an enlarged sectional view of a portion of FIG. 1.

A slide pin 10 is mounted upon connector 5 for axial movement and normally assumes a position indicated by phantom lines in FIG. 2. When the motor drive unit and the magazine unit are coupled and assembled with the camera, the slide pin is retracted to the illustrated full-line position against the force of a spring 11 by engagement with the connector 6 of the magazine unit 17. An insulator cap 12 is secured to the forward end of the slide pin to displace one of leaf spring terminals 13 and 14 constituting a switch S6, and thereby to open the switch. Terminals 13 and 14 are mounted on motor drive unit 2 by insulators 15 and a fastener 16.

Magazine 17 is provided with sprocket 18 which is rotated by film in order to count the number of frames of the film which is advanced by a sprocket (not shown) of the camera, the sprocket being rotated by motor M1 when the film is wound up. Thus, the rotation of the sprocket 18 is transmitted to a frame counter 22 of the inverse inverse-count type through gears 20 and 21. The counter 22 is provided with a switch S7 which is opened when the counter 22 indicates zero. The magazine unit also includes a drive motor M2, which, as will be seen hereinafter, is controlled by a switch S5 (FIG. 3) of the motor drive unit when the magazine unit is coupled to the drive unit. A gear 23 is secured to the shaft of motor M2 and engages a two-step gear 24, which in turn meshes with a gear 25 secured to the film take-up spool 19 by means of a pin 26. Thus, rotation of the motor M2 is transmitted through gears 23, 24 and 25 to the film take-up spool 19, which rotates to take-up the film FIGS. 3 and 4 show two embodiment of the invention by which single frame phototaking can be carried out.

Figure 3:
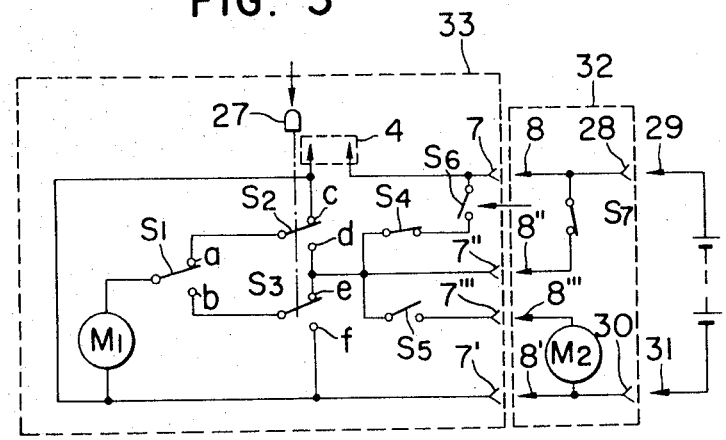
FIG. 3 is a circuit diagram of a first embodiment of the invention.
Figure 4:
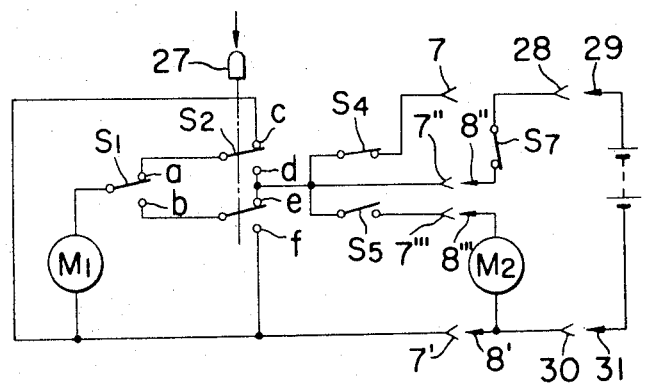
FIG. 4 is a circuit diagram of a second embodiment of the invention.

In FIG. 3 the portion encircled by a broken line 32 illustrates the circuit of the long-film magazine unit 17, and the portion encircled by the broken line 33 illustrates the circuit of the motor drive unit 2. As is the case with the aforesaid terminals 7 and 8, the terminals 7', 7'', 7''' of connector 5 of the motor drive unit are adapted to be connected, respectively, to terminals 8', 8'', and 8''' of connector 6 of the long-film magazine unit 17.

A switch S1 in series with motor M1 is connected to a terminal a when film wind-up and shutter charge operations by the driving mechanism (not shown) are completed (as shown in FIG. 3), while automatically switched over to a terminal b in a state where shutter release by the driving mechanism is finished. Switches S2 and S3 are connected to terminals c and e, respectively, when push button 27 is freed (FIG. 3), while switched over to terminals d and e when the push button 27 is depressed.

The embodiment of the invention illustrated in FIGS. 1 to 3 operates in the following manner: The long-film magazine 17 and the motor drive unit 2 are coupled together and assembled with the camera body, whereby electrical connection is established between the circuits of the units through the terminals groups 7, 7', 7'', 7''' and 8, 8', 8'', 8'''. Concurrently, the slide pin 10 of the motor drive unit is actuated to open switch S6. As a result, the frame counter switch S4 of the motor drive unit 2, which is connected in series with the switch S6 and which normally (in the absence of the magazine unit 17) controls the energization of the motor M1, is rendered ineffective. Instead, control of the energization of motor M1 is assumed by switch S7 of magazine unit 17, an alternate energization circuit being provided through terminals 7'' and 8''.

If the push button 27 of the motor drive unit is moved in one direction, switch S2 is transferred from terminal c to terminal d, and switch S3 from terminal e to terminal f, thereby providing a motor driving circuit from an external power source (not shown) connected to connector 4 and through terminals 7 and 8, switch S7, terminals 8'' and 7'', terminal d of switch S2, terminal a of switch S1, motor M1 and back to the power source. Thus, motor M1 is energized to actuate shutter release mechanism (not shown) so that shutter release is effected. When the shutter release is completed, switch S1 connected to terminal a is switched over to terminal b, providing a short-circuit from motor M1, through terminal b of switch S1, terminal f of switch S3 to motor M1 so that motor M1 is stopped from rotating.

If the push button 27 is freed, switch S2 connected to terminal d is switched over to terminal c, and switch S3 contacting terminal f is switched over to terminal e. Thus, there is formed a further driving circuit from the external power source and through terminals 7 and 8, switch S7, terminals 8'' and 7'', terminal e of switch S3, terminal b of switch S1, motor M1 and back to the external power source. As a result, motor M1 is again rotated to actuate film winding-up and shutter charging mechanisms (not shown) so that the sprocket of the camera is rotated by an angular distance which is required to advance a frame of the film (film winding-up operation) and shutter charge operation is carried out. With the film winding-up and shutter charge operations, switch S5 is closed, thereby providing a motor driving circuit from the external power source and through terminals 7 and 8, switch S7, terminals 7'' and 8'', switch S5, terminals 7''' and 8''', motor M2 and back to the external power source. Thus, motor M2 is rotated. By this rotation of the motor M2, film take-up shaft 19 of the long film magazine unit is rotated through gears 23, 24 and 25 so that film length advanced by the sprocket which is rotated by the motor M2 is wound up. As above mentioned, the film wind-up operation is carried out by simultaneously rotating the motors M1 and M2.

Upon the completion of the film wind-up and shutter charge operations, switch S1 is switched over to terminal a, thereby providing a short-circuit from motor M1 through terminal a of switch S1, terminal c of switch S2 to the motor M1 so that motor M1 is deenergized. Then, switch S5 is opened. In other words, when the push button 27 is freed, the film wind-up and shutter charge operations are completed as shown in FIG. 3.

Thus, a single frame phototaking can be carried out.

Through the described series of operation, the film is progressively advanced and the shutter charged and released to accomplish picture-taking. When the frame counter dial 22 of the long-film magazine unit reaches its zero position, switch S7 is opened to break the circuit through S7 from the power source at connector 4, thereby deenergizing the entire system.

Although operation of the system has been described in conjunction with an external power source connected to connector 4, a self-contained power source, such as a battery or the like, may be employed, terminals 7 and 7' being then connected to terminals 29 and 31, respectively. If the long-film magazine 17 is used, the connection may alternatively be accomplished by the use of the terminals 28 and 30 of the long-film magazine.

FIG. 4 illustrates an embodiment of the invention in which the external power source connector 4 is eliminated, as well as the switch S6, the slide pin 10, and terminal 8. The construction is otherwise similar to that of FIGS. 1 - 3. Terminals 7 and 7' of the connector are connected with the terminals 29 and 31 of the self-contained power source when the long-film magazine is not used. In this case, operation of the motor drive unit is controlled by switch S4. When the long-film magazine unit is used, terminals 29 and 31 of the power source are connected with terminals 28 and 30, respectively, of the long-film magazine unit, and terminals 8, 8'', and 8''' of the long-film magazine unit areconnected with terminals 7', 7'', and 7''', respectively, of the motor drive unit. In this case, the operation of the long-film magazine unit and the motor drive unit will be controlled by the switch S7. It is apparent that in the embodiment of FIG. 4 switch S4 is rendered ineffective by using terminal 7'' instead of terminal 7 for power supply.

Thus, according to the present invention, when the motor drive unit and the long-film magazine unit have been assembled with a camera, only the frame counter dial switch S7 of the long-film magazine unit acts to control the overall operation, independently of the frame counter dial switch S4 of the motor drive unit. Accordingly, only the frame counter dial 22 of the long-film magazine unit needs to be set to a desired number of frames to be photographed, thereby eliminating the inconveniences associated with the setting of the frame counter dial of the motor drive unit and affording simplification of operation.

We claim:

1. A motor drive unit for a camera, comprising means including an electric motor for advancing film, a counter for counting the number of film frames, means including a switch associated with said counter for providing an energization circuit for said motor and for de-energizing said motor when said counter has reached a given count, and means for rendering said switch ineffective to provide an energization circuit for said motor and for providing another energization circuit for said motor independently of said switch.

2. A motor drive unit in accordance with claim 1, wherein the last-mentioned means comprises a long-film magazine having a film-frame counter and means including a switch associated with the last-mentioned counter for opening the last-mentioned circuit when the last-mentioned counter reaches a given count.

3. A motor drive unit in accordance with claim 1, wherein the last-mentioned means comprises a long-film magazine having means for coupling the same to said drive unit and for rendering said switch ineffective and providing said other energization circuit upon the coupling of said magazine to said drive unit.

4. A drive system for a camera, comprising a motor drive unit having means including an electric motor for advancing film in the camera, having a first film-frame counter means, and having first means including a first switch for controlling the energization of said motor in order to deenergize said motor when said first counter means reaches a given count; a long-film magazine unit having a second film-frame counter means and having second means including a second switch for controlling the energization of said motor in order to deenergize said motor when said second counter means reaches a given count, and means for rendering said second means effective to control the energization of said motor instead of said first means.

5. A drive system in accordance with claim 4, wherein said motor drive unit and said long-film magazine unit include means for coupling the same and wherein said rendering means is responsive to said coupling.

6. A system in accordance with claim 5, wherein the last-mentioned means comprises a further switch in said drive unit in series with the first switch and means for opening the further switch when the drive unit and the long-film magazine unit are coupled.

7. A system in accordance with claim 5, wherein the last-mentioned means comprises means for selectively connecting a power source either directly to a circuit of said drive unit including said first switch or through a circuit of said long-film magazine unit to a circuit of said drive unit not including said first switch.

8. A system in accordance with claim 4, wherein said long-film magazine unit has means including a second electric motor for advancing film from said magazine, and wherein said drive unit has means including another switch for controlling said second electric motor cooperatively with said first electric motor to effect film advance.

* * * * *